(12) United States Patent
Akahori

(10) Patent No.: US 7,715,500 B2
(45) Date of Patent: May 11, 2010

(54) FSK SIGNAL DETECTOR FOR DETECTING FSK SIGNAL THROUGH DIGITAL PROCESSING

(75) Inventor: Hiroji Akahori, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 824 days.

(21) Appl. No.: 11/524,951

(22) Filed: Sep. 22, 2006

(65) Prior Publication Data

US 2007/0071138 A1    Mar. 29, 2007

(30) Foreign Application Priority Data

Sep. 27, 2005   (JP) ............................. 2005-280078

(51) Int. Cl.
*H03D 3/00* (2006.01)
(52) U.S. Cl. ..................................... 375/334
(58) Field of Classification Search ................ 375/334, 375/335, 336, 337, 272, 274, 275
See application file for complete search history.

(56) References Cited

U.S. PATENT DOCUMENTS 4,291,275 A * 9/1981 Nossen ........................ 329/303

2005/0105653 A1   5/2005   Mizuno

FOREIGN PATENT DOCUMENTS

JP           09-036924          7/1997

* cited by examiner

*Primary Examiner*—Kevin Y Kim
(74) *Attorney, Agent, or Firm*—Studebaker & Brackett PC; Donald R. Studebaker

(57) ABSTRACT

In an FSK signal detector, an output from a limiter amplifier and an FSK signal are supplied to a comparator. The comparator has its output connected to two channels each composed of a correlator, an absolute value calculator and a digital low-pass filter in this order. The correlators calculate correlation between the output of the comparator and correlation signal strings ($C_n$ to $C_{2n}$, $D_n$ to $D_{2n}$) exhibiting certain periodicity. Outputs from the digital low-pass filters are calculated by a subtractor to be developed as demodulated data from a sign determination circuit. An FSK signal detector is provided which is capable of eliminating the adverse effect of fluctuations of an FSK signal.

9 Claims, 10 Drawing Sheets

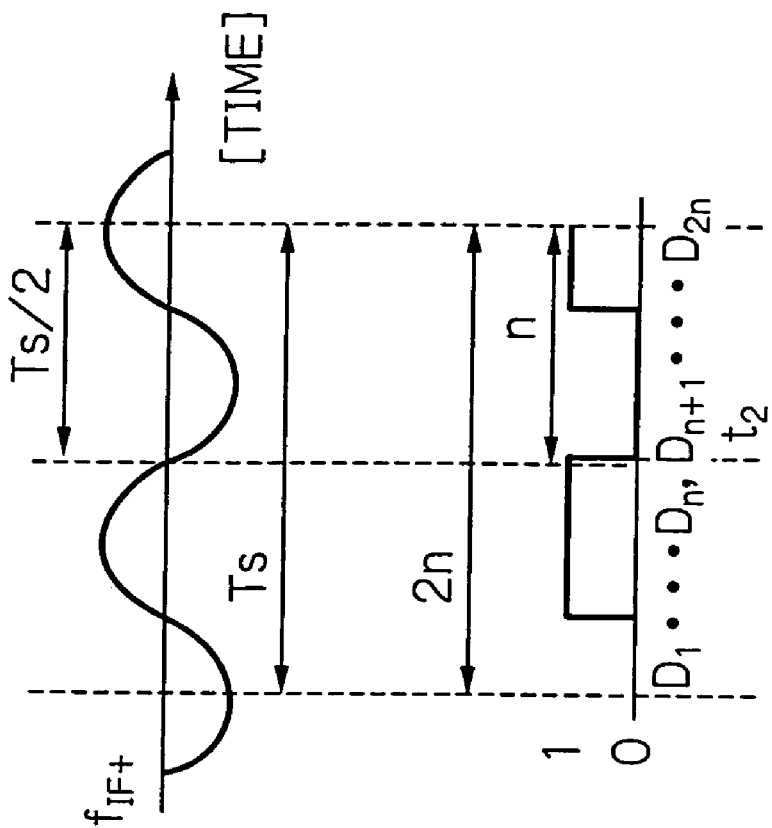
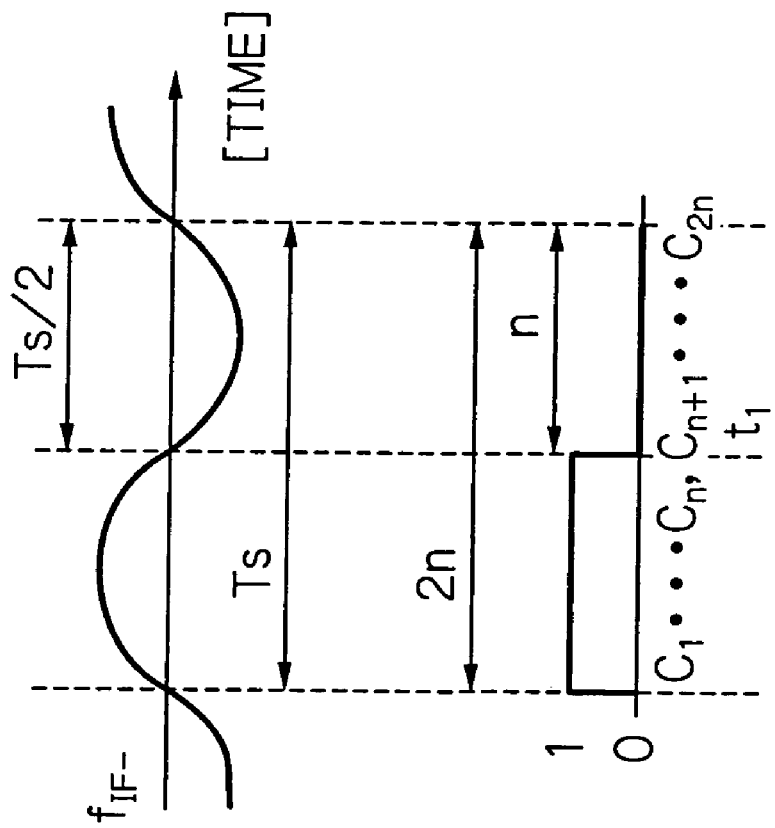
Fig. 4A
Fig. 4B

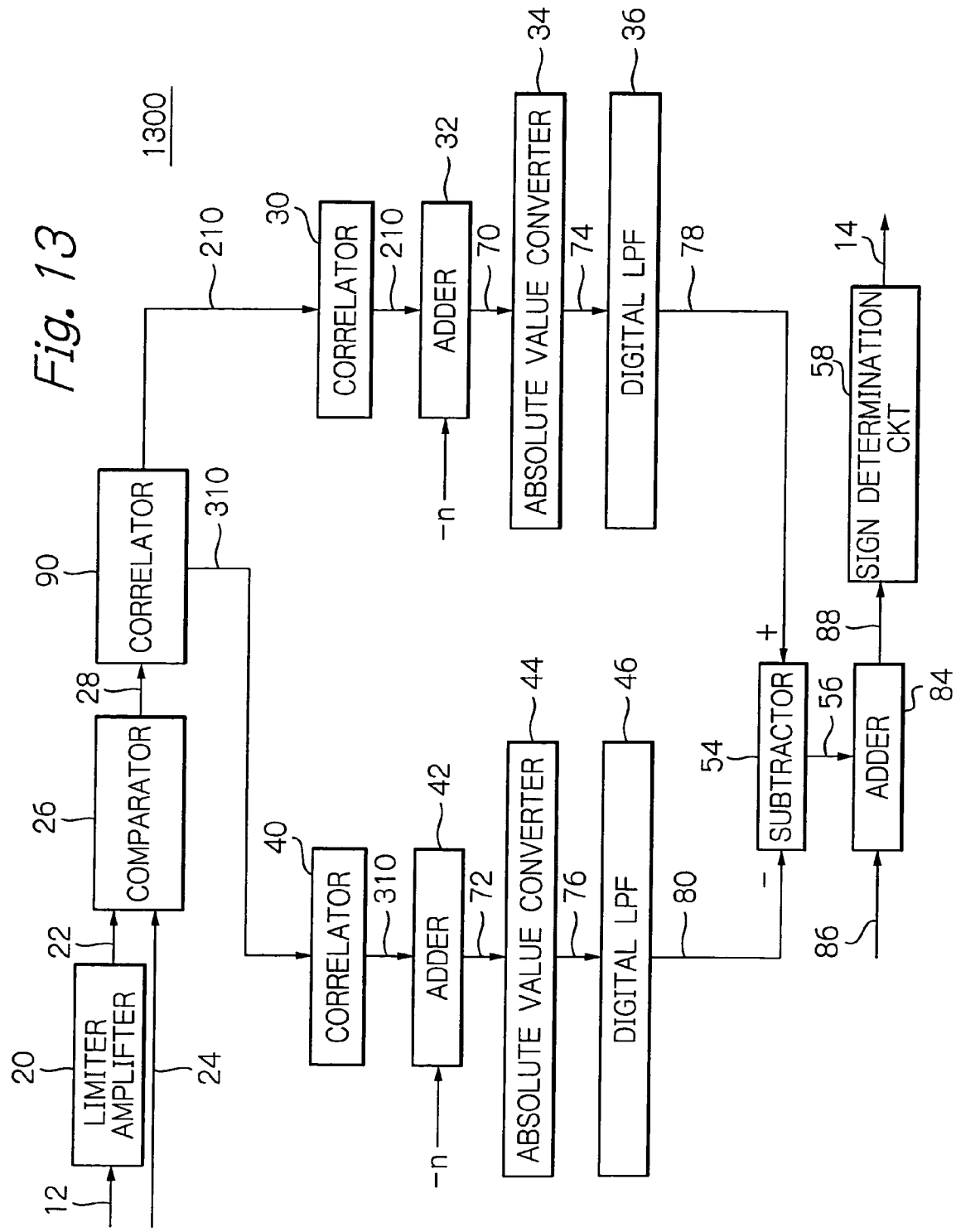

FSK SIGNAL DETECTOR FOR DETECTING FSK SIGNAL THROUGH DIGITAL PROCESSING

BACKGROUND OF THE INVENTION

1. Field of the Invention

The present invention relates to a frequency shift keying (FSK) signal detector for detecting an FSK signal. More particularly, the present invention relates to an FSK signal detector for detecting an FSK signal through digital processing.

2. Description of the Background Art

Up to now, an FSK signal detector, detecting an FSK signal by digital signal processing, includes a quadrature detection circuit, made up by, for example, an oscillator, a 2/π-phase shifter and a pair of multipliers. The quadrature detection circuit decomposes a received input intermediate frequency (IF) signal by quadrature detection into an I (in-phase) signal and a Q (quadrature) signal, which are baseband signals, and quantizes these I and Q signals, using an analog-to-digital (A/D) converter, to generate digital data representing amplitude information. These data are input to a phase detector having a table indicating the relationship between the amplitudes of the I and Q signals and $\tan^{-1}\theta$ to generate phase information corresponding to the information of the amplitudes of the I and Q signals. The one-symbol delay difference of the phase information, obtained from the amplitudes of the I and Q signals, is then found out to determine how the phase has shifted, in order to output a detection signal.

For example, if, if a phase $\theta_1$ is detected with a symbol S1, a phase $\theta_2$ is detected with a symbol S2, next following the symbol S1, and the phase difference $\theta_2$-$\theta_1$ is positive, then the phase has advanced during the time of transfer from the symbol S1 to the next symbol S2. If the phase $\theta_1$ is detected for the symbol S1, the phase $\theta_3$ is detected for the next following symbol S3 and the phase difference $\theta_3$-$\theta_1$ is negative, then the phase has lagged during the time of transfer from the symbol S1 to the next symbol S3, so that the frequency has become lower at symbol S3 than that at symbol S1. In this manner, the state-of-art FSK signal detector frequency-detects the FSK signal by reading the frequency shift between symbols for phase shift between symbols.

For simplifying the configuration of a receiving circuit, adapted for receiving an FSK signal, it has also been proposed to convert an output of a receiving analog circuit into a bi-level signal and to detect a frequency component by digital signal processing by way of performing demodulation.

In Japanese Laid-Open Patent Publication 36924/1997, there is disclosed a multi-level FSK receiving device for taking out the frequency information to high accuracy.

In the state-of-art FSK signal detector, the frequency detection is carried out on the basis of amplitude information of I and Q signals. Thus, if the amplitudes of the I and Q signals are varied by, e.g. noise, such variations in the amplitudes affect the characteristics of the frequency detection. The state-of-art FSK signal detector also suffers from the problem that it is necessary to use components, such as A/D converters, and that, since the amplitude information of the I and Q signals are represented with plural bits, the circuit is complicated in constitution.

In an FSK signal detector, disclosed in U.S. Patent Application Publication US 2005/0105653 A1 to Mizuno, it may be contemplated that, if a signal other than frequency components provided in a correlator is received, not only the frequency components contained in such signal but also the phase components of an input signal are simultaneously output, such that, even in the case there are no variations in frequency components, the output of the FSK signal detector may undergo fluctuations.

SUMMARY OF THE INVENTION

It is an object of the present invention to provide an FSK signal detector in which amplitude fluctuations in the FSK signal do not affect characteristics of frequency detection, thereby eliminating the effect of the fluctuations.

In accordance with the present invention, there is provided an FSK signal detector including a binarizing circuit, a first correlator, a second correlator, and an operating circuit. The binarizing circuit receives an FSK signal for binarizing the amplitude of the FSK signal. The first correlator receives the FSK signal, binarized by the binarizing circuit, for finding the correlation of the FSK signal by a first correlation signal string which may be used to acquire a correlation value by one of two frequency components generated on FSK modulation. The second correlator receives the FSK signal, binarized by the binarizing circuit, for finding the correlation of the FSK signal by a second correlation signal string which may be used to acquire a correlation value by the other of the two frequency components generated on FSK modulation. The operating circuit performs calculations on outputs of the first and second correlators to detect the FSK signal to output the FSK signal detected.

According to the present invention, the frequency components, generated in two channels on FSK modulation, are antiphase relative to each other, by virtue of the operating circuits adapted for performing calculation on the outputs of first and second correlators to detect and output an FSK signal. Hence, it is possible to cancel out and eliminated unneeded fluctuation components in the two channels. Consequently, only frequency components, generated on FSK modulation, may be obtained, while reception characteristics may be prevented from being deteriorated due to unneeded fluctuation components.

In accordance with the present invention, there is provided an FSK signal detector including a binarizing circuit, a first correlator, a second correlator, and an operating circuit. The binarizing circuit binarizes a received FSK signal and outputs a binarized FSK signal. The first correlator stores the binarized FSK signal and generates a first correlation value with a plurality of binarized FSK signals. The second correlator stores the binarized FSK signal and generates a second correlation value with a plurality of binarized FSK signals. The operating circuit detects the received FSK signal with the first and second correlation value.

BRIEF DESCRIPTION OF THE DRAWINGS

The objects and features of the present invention will become more apparent from consideration of the following detailed description taken in conjunction with the accompanying drawings in which:

FIGS. 4A and 4B plot the relationship between the waveforms of frequency components $f_{IF-}$ and $f_{IF+}$, the symbol lengths and the correlation signal $C_1$-$C_{2n}$ in the case where the virtual phase of a section $C_1$-$C_{n+1}$ of a correlation signal string and the virtual phase of a section $D_1$-$D_{n+1}$ of the other correlation signal string are in phase with each other, respectively;

FIG. 13 is a schematic block diagram showing another alternative embodiment of the FSK signal detector to which the correlator shown in FIG. 11 has been applied.

DESCRIPTION OF THE PREFERRED EMBODIMENTS

Figure 1:
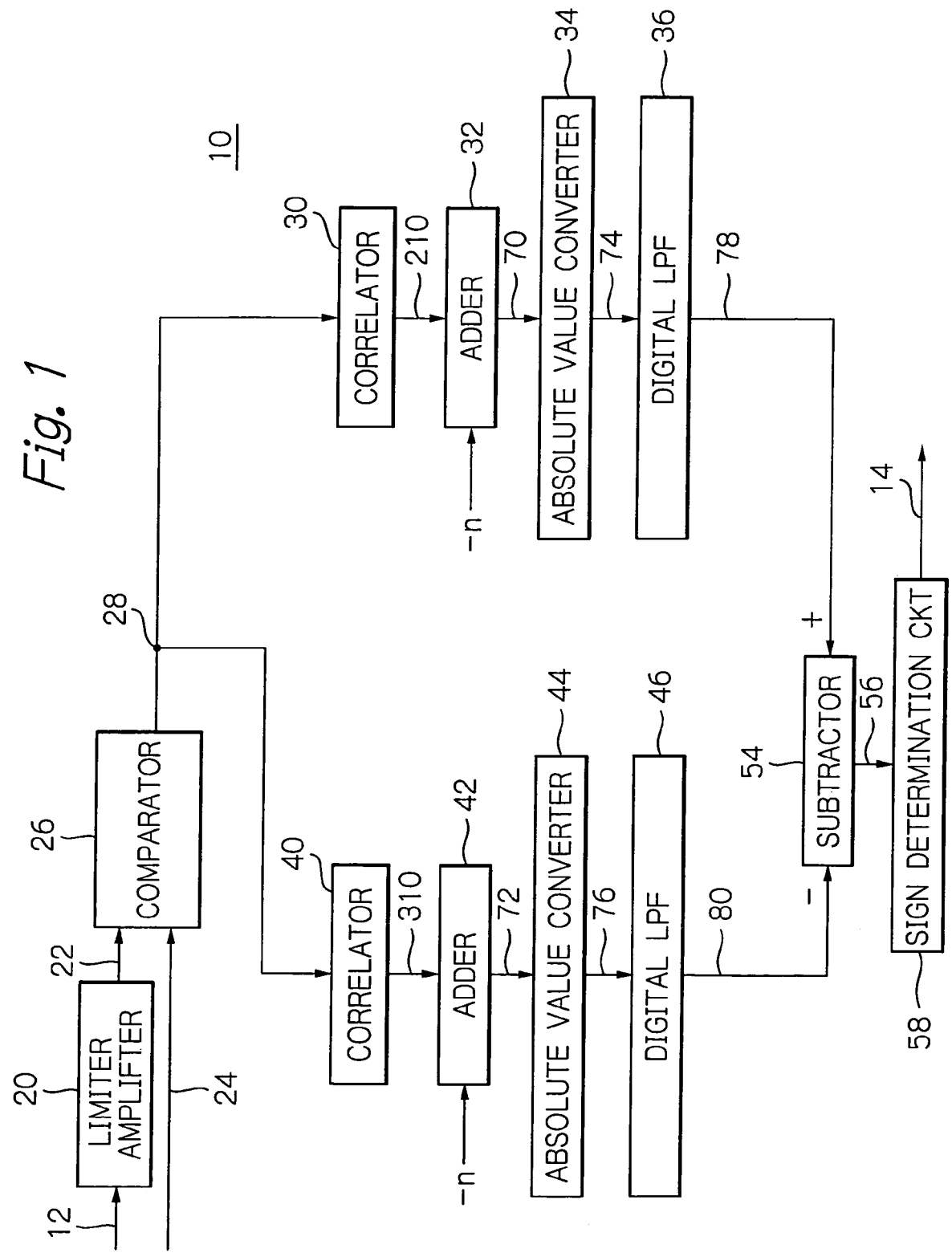
FIG. 1 is a schematic block diagram showing a preferred embodiment of an FSK signal detector according to the present invention.

With reference to the accompanying drawings, a preferred embodiment of a frequency shift keying (FSK) signal detector according to the present invention will be described in detail. Referring to FIG. 1, an FSK signal detector 10 of the embodiment illustrated frequency-detects an FSK signal 112 by digital processing to output demodulated data 14, and includes a limiter amplifier 20, applied with the FSK signal 12, and a comparator 26. To the comparator 26 are connected an output 22 of the limiter amplifier 20 and an input 24. In the figures, reference numerals added to connections indicate signals which appear on those connection lines.

The comparator 26 has its output 28 connected a correlator 30, an adder 32, an absolute value converter 34 and a digital low-pass filter (LPF) 36 in series, in this order, to form a channel of a processing circuit. To the output 28 of the comparator, there are also connected a correlator 40, an adder 42, an absolute value converter 44 and another digital low-pass filter 46 in series, in this order, to form another channel of a processing circuit. The digital low-pass filters 36 and 46 have the outputs thereof 78 and 80, respectively, connected to a subtractor 54, which has its output 56 connected to a sign determination circuit 58 adapted for outputting demodulated data 14.

The limiter amplifier 20 is applied with the FSK signal 12, down-converted from a received high frequency signal to an intermediate frequency (IF) received signal of several megahertz (MHz). The limiter amplifier 20 is an amplitude limiting circuit for limiting the amplitude of the FSK signal 12 to a preset level to suppress components thereof corresponding to frequency variations. This enables frequency detection to be carried out without being affected by amplitude variations.

The limiter amplifier 20 outputs a signal, in which components corresponding to amplitude variations have been suppressed, as an FSK signal 22.

The comparator 26, connected to the limiter amplifier 12, is a binarizer circuit which converts the amplitude of the FSK signal 12, output from the limiter amplifier 20, into a bi-level form signal. Specifically, the comparator 26 receives a mid-point voltage, approximately equal to a mid-point level of the FSK signal 12, on an input 24 thereof, and compares this mid-point potential 24 with the FSK signal 22 to generate and output an FSK signal 28 which has the value of "1" when the amplitude of the FSK signal 22 is equal to or larger than the mid-point potential 24, and the value of "0" when the amplitude of the FSK signal 22 is smaller than the mid-point potential 24. In this way, circuits subsequent to the comparator 26 outward can handle the amplitude of the FSK signal as a bi-level signal with an amplitude of "1" or "0".

Figure 2:
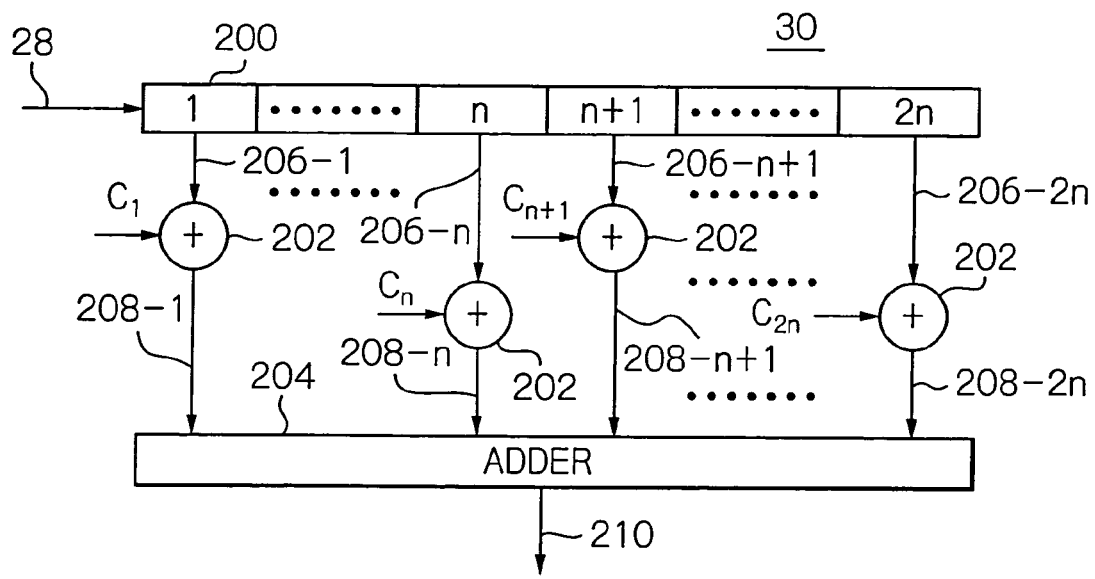
FIG. 2 is a schematic block diagram showing an illustrative constitution of a correlator included in the illustrative embodiment shown in FIG. 1.

The correlators 30, 40, connected to the output 28 of the comparator 26, are used for finding the correlation of the bi-level FSK signal with correlation signal sequences each having predetermined periodicity. The correlator 30 has 2n stages of a shift register 200, a plurality of operating circuits 202 for taking exclusive OR (EXOR), and an adder 204, as shown in FIG. 2 depicting the illustrative inner constitution thereof, where n is a natural number.

The shift register 200, connected to the comparator 26, is composed of 2n stages of shift register units (1, ..., n, n+1, ..., 2n) and sequentially receives the binarized FSK signal 28 in response to clocks, not shown, supplied from outside. The so received FSK signals are sequentially shifted through the respective shift register units. It is noted that, with the center frequency $f_{IF}$ of the FSK signal 28, the maximum frequency shift of $\pm \Delta f_d$, the frequency on frequency shifting towards the plus side of $f_{IF+}$, where $f_{IF+}=f_{IF}+\Delta f_d$, and the frequency on frequency shifting towards the minus side of $f_{IF-}$, where $f_{IF-}=f_{IF}-\Delta f_d$, the frequency of the clock CLK, or operating clock frequency, $f_{CLK}$ is preferably set to a value satisfying the relationship of $(f_{CLK}/f_{IF-})-(f_{CLK}/f_{IF+}) \geq 8$, as will be described subsequently.

In the present embodiment, the number of stages of the 2n-stage shift register 200 is set so that 2n nearly equal $f_{CLK}/f_{IF-}$. By this mathematical relationship, it is meant that, if the quotient is even, the quotient is to be 2n and, otherwise, an even number closest to the quotient is to be 2n. If, in that case, the FSK signal 28 has been frequency-shifted to the frequency $f_{IF-}$, the 2n-stage shift register 200 is able to store approximately one period of the FSK signal 28. If the FSK signal 28 has been frequency-shifted to the frequency $f_{IF+}$, the 2n-stage shift register is able to store approximately $(1+8 f_{IF+}/f_{CLK})$ period of the FSK signal.

The shift register units of the first to 2n-th stages of the 2n-stage shift register 200 have the outputs thereof interconnected to the plurality of operating circuit 202. Specifically, the FSK signals 206-1 to 206-2n, output from the register units of the respective stages, are transmitted to the plurality of operating circuit 202.

The plurality of operating circuit 202 take exclusive-OR of FSK signals 206-1 to 206-2n, output from the register units of the first to 2n-th stages, and a correlation signal string $C_1$ to $C_{2n}$, transmitted to the respective operating units, to output the results of the operations as FSK signals 208-1 to 208-2n to the adder 204.

Figure 3:
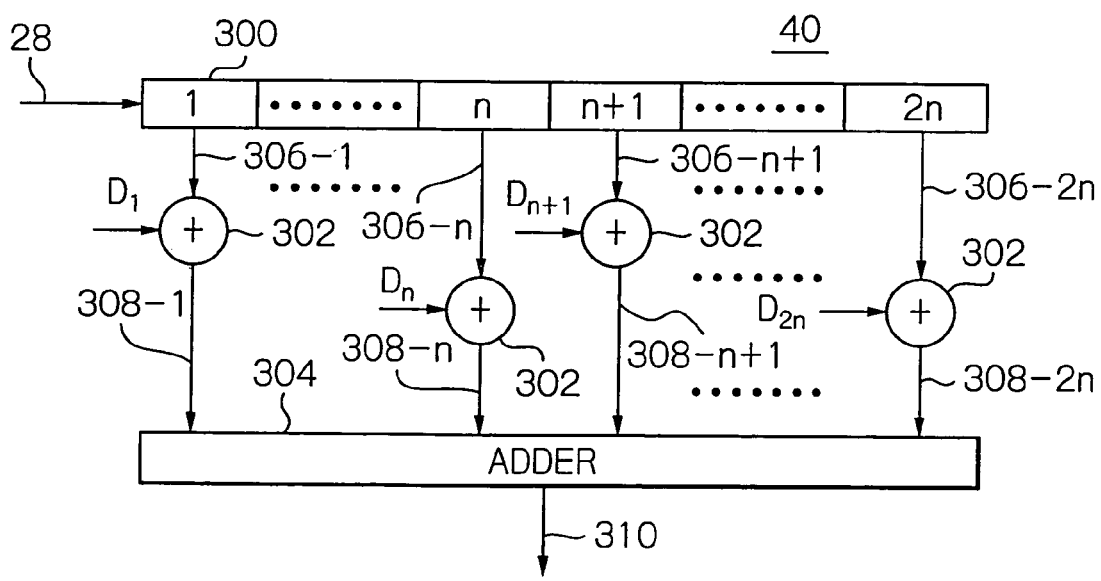
FIG. 3 is a schematic block diagram showing an illustrative constitution of another correlator applicable to the illustrative embodiment.

FIG. 3 shows a typical illustrative constitution of the correlator 40. Similarly to the correlator 30, shown in FIG. 2, the correlator 40 includes a 2n-stage shift register 300, a plurality of operating circuits 302 for taking exclusive-OR (EXOR), and an adder 304. Although the correlator 40 may be the same as the correlator 30, shown in FIG. 2, except that a correlation signal sequence ($D_1$ to $D_{2n}$) is input to the operating circuits 302, the correlator 40 is otherwise similar in constitution to the correlator 30. Hence, detailed description of the correlator 300 is dispensed with.

It is assumed here that the correlation signal sequences $C_1$ to $C_{2n}$ and $D_1$ to $D_{2n}$ are signal strings exhibiting the following periodicity. It is noted that the following signal sequences are used for explanation. It is assumed that the frequency component of the FSK signal, having a modulation signal "0", is $f_{IF-}$ Hz, and that the frequency component of the FSK signal, having a modulation signal "1", is $f_{IF+}$ Hz, with the rate of modulation being D_r Hz. With the present FSK frequency detector, there is a relationship of $f_{IF-}$=D_r. The time needed for the FSK signal to pass through the 2n-stage shift register 200 is set so as to be equal to duration (TS) of one symbol of the FSK signal.

Figure 5A:
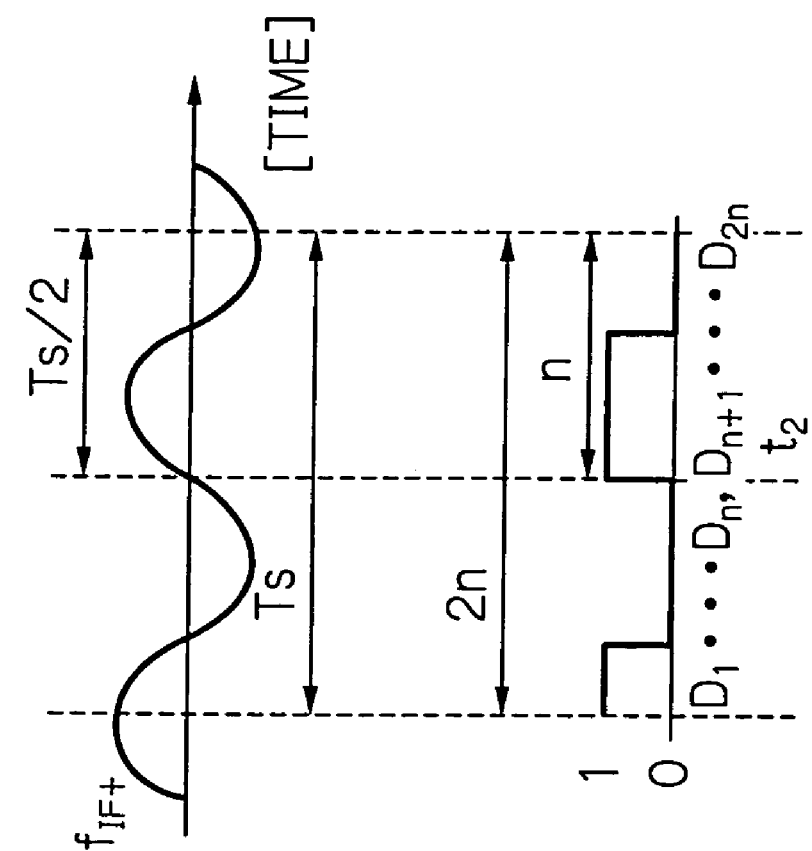
FIGS. 5A and 5B plot the relationship between the waveforms of frequency components $f_{IF-}$ and $f_{IF+}$, the symbol lengths and the correlation signal $C_1$-$C_{2n}$ in the case where the virtual phase of a section $C_1$-$C_{n+1}$ of a correlation signal string and the virtual phase of a section $D_1$-$D_{n+1}$ of the other correlation signal string are in antiphase with each other, respectively.
Figure 5B:
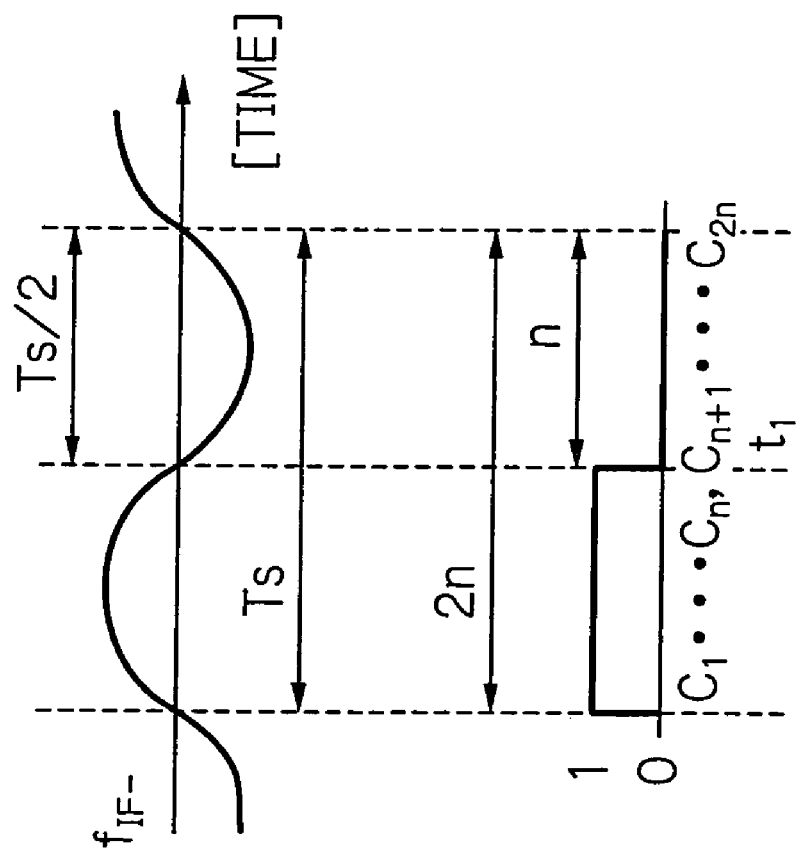

The correlation signal strings, used in the present embodiment, satisfy the following conditions. The correlation signal strings, satisfying these conditions, are shown in FIGS. 4 and 5. FIGS. 4A and 4B plot the relationship between the waveforms of frequency components $f_{IF-}$ and $f_{IF+}$, the symbol lengths and the correlation signal $C_1$-$C_{2n}$ in the case where the virtual phase of a section $C_1$-$C_{n+1}$ of a correlation signal string and the virtual phase of a section $D_1$-$D_{n+1}$ of the other correlation signal string are in phase with each other, respectively. On the other hand, FIGS. 5A and 5B plot the relationship between the waveforms of frequency components $f_{IF-}$ and $f_{IF+}$, the symbol lengths and the correlation signal $C_1$-$C_{2n}$ in the case the virtual phase of a section $C_1$-$C_{n+1}$ of a correlation signal string and the virtual phase of a section $D_1$-$D_{n+1}$ of the other correlation signal string are in antiphase with each other, respectively.

In more detail, the correlation signal string $C_1$ to $C_{2n}$, referred to below as a C string, is of a periodic waveform having 2n as one wavelength and represented by 1 or 0. The correlation signal string $D_1$ to $D_{2n}$, referred to below as a D string, needs to be of a period corresponding to the wavelength as matched to the frequency component $f_{IF+}$ and hence has a $2n \cdot f_{IF-}/f_{IF+}$ as one wavelength and a periodic waveform represented by 1 or 0. It is noted that, if $2n \cdot f_{IF-}/f_{IF+}$ is not an integer, it is to be an even number close to $2n\ f_{IF-}/f_{IF+}$ as a wavelength.

With the foregoing as a presupposition, the number of "1"s and the number of "0"s in the C string are equal to each other to be n, while the number of "1"s and the number of "0"s in the D string are equal to each other to be also n. This is to be the first condition. Under the first condition, the point of phase transition from 1 to 0 (time t1) and the point of phase transition from 0 to 1 (time t2) are located between $C_n$ to $C_{n+1}$ and $D_n$ to $D_{n+1}$, respectively. As a second condition, the phase between $C_n$ and $C_{n+1}$ as the center of the C string and that between $D_n$ and $D_{n+1}$ as the center of the D string are the same phase as each other or the phases inverted 180 degrees from each other. The reason is that absolute value converters 34, 44 as later described are provided subsequent to the correlators 30, 40, so that, even when the center of the C string and that of the D string are inverted 180 degrees from each other, the same value may be output from the absolute value converters 34, 44.

Returning now to FIG. 2, the adder 204 counts the number of the FSK values, having the value of "1", out of the FSK signals 208-1 to 208-2n, output from the plural operating circuits 202, to output a frequency detection output 210, representing the so counted number. The number of the FSK signals, having the value of "1", is equal to the sum of the FSK signals, having the value of "1", out of the FSK signals stored in the first to n-th stage register units of the shift register 200, and the FSK signals, having the value of "0", out of the FSK signals stored in the (n+1)-th to 2n-th stage register units of the shift register 200. In a similar manner, the adder 304 shown in FIG. 3 counts the number of the FSK signals, having the value "1", out of the FSK signals 308-1 to 308-2n, output from the operating circuits 302, supplied with the correlation signal string $D_1$ to $D_{2n}$, to output a frequency detected output 310 representing the so counted number. The outputs 210, 310 of the adders 204, 304 form outputs of the correlators 30 and 40, respectively, and are coupled to the adders 32, 42, respectively, FIG. 1.

Returning to FIG. 1, the absolute value converters 34, 44 are connected to outputs 70, 72 of the adders 32, 42, respectively. The absolute value converters 34, 44 have the outputs 74, 76 thereof, respectively, interconnected to digital low-pass filters 36, 46. The digital low-pass filters 36, 46 have the outputs 78, 80 thereof, respectively interconnected to the subtractor 54.

The adder 32 is an addition circuit for adding a value of −n to the frequency detection output 210, output from the correlator 30. The adder subtracts a value of n from the frequency detection output 210 to transmit the result of the subtraction in the form of frequency detection output 70. This transforms the frequency detection output 210 into a waveform centered about a mid point of the width of variation as zero.

The absolute value converter 34, connected to the output 70 of the adder 32, calculates an absolute value of the frequency detection output 70, output from the adder 32, and outputs the so calculated absolute value as a frequency detection output 74.

The digital low-pass filter 36, connected to the output 74 of the absolute value converter 34, is adapted for taking an average value over a one-symbol width or duration of the frequency detection output 74, transmitted from the absolute value converter 34, for a period of one symbol time duration Ts. The digital low-pass filter 36 converts the frequency detection output 74, into a frequency detection signal, the amplitude of which is changed with the frequency excursion of the FSK signal, to transmit the result on the output 78. The output 78 of the digital low-pass filter 36 is coupled to a non-inverted (+) input of the subtractor 54.

The other adder 42 has its output 72 similarly connected to the absolute value converter 44, which is adapted to calculate an absolute value of the frequency detection output 72 and output the so calculated absolute value in the form of frequency detection output 76. The frequency detection output 76 is coupled to the digital low-pass filter 46, which is adapted to transform the frequency detection output 76 into a frequency detection signal having its amplitude changed responsive to the frequency excursions of the FSK signal. The frequency detection signal generated is transmitted as an output 80. The output 80 of the digital low-pass filter 46 is coupled to an inverted (−) input of the subtractor 54.

The subtractor 54 is supplied with the frequency detection signal, output from the digital low-pass filter 36, on its non-inverted (+) input 78, while being supplied with the frequency detection signal, output from the digital low-pass filter 46, on its inverted (−) input 80, to find the difference between these two frequency detection signals 78, 80. The subtractor 54 outputs a resultant difference value, thus found, on its output 56.

The output 56 of the subtractor 54 is coupled to the sign determination circuit 58. The sign determination circuit 58 is adapted to determine the sign, i.e. positive or negative, of the output value of the subtractor 54 to generate demodulated data conforming to the decision. The sign determination circuit 58 outputs the demodulated data, obtained by the decision, on its output 14.

Figure 6:
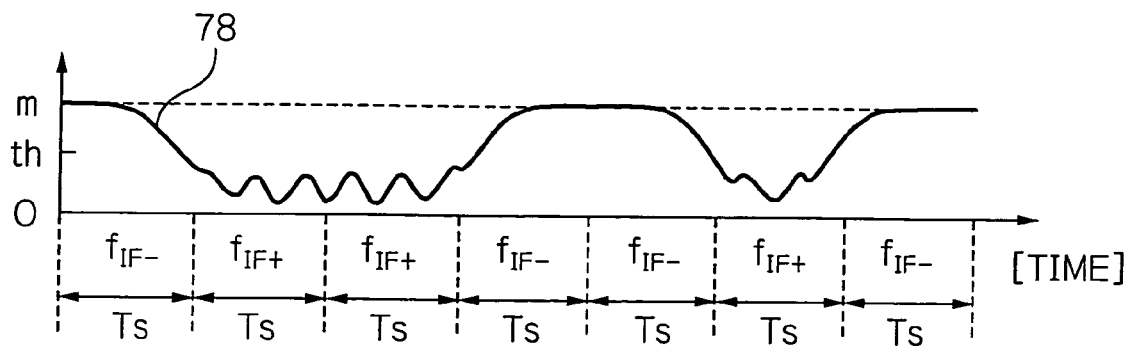
FIGS. 6 and 7 plot illustrative output waveforms of the digital low-pass filters provided in the illustrative embodiment.
Figure 7:
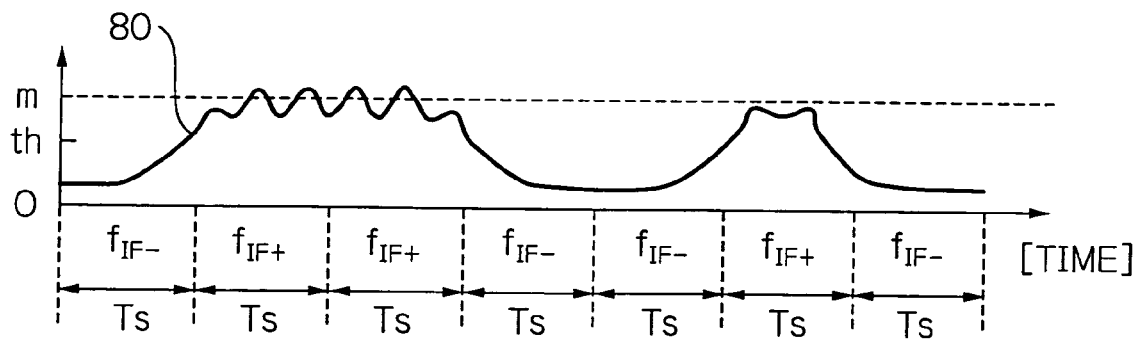
Figure 8:
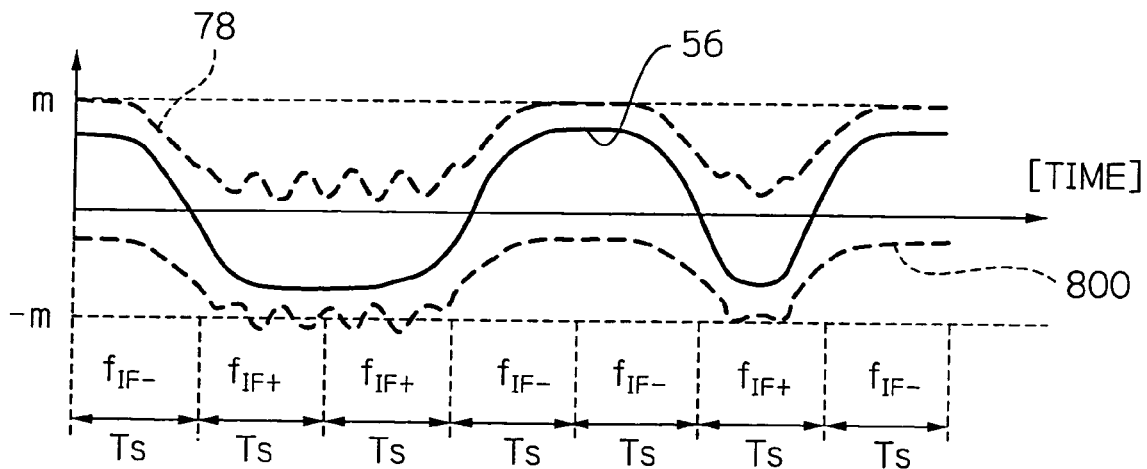
FIG. 8 plots an illustrative output waveform of the subtractor provided in the illustrative embodiment.
Figure 9:
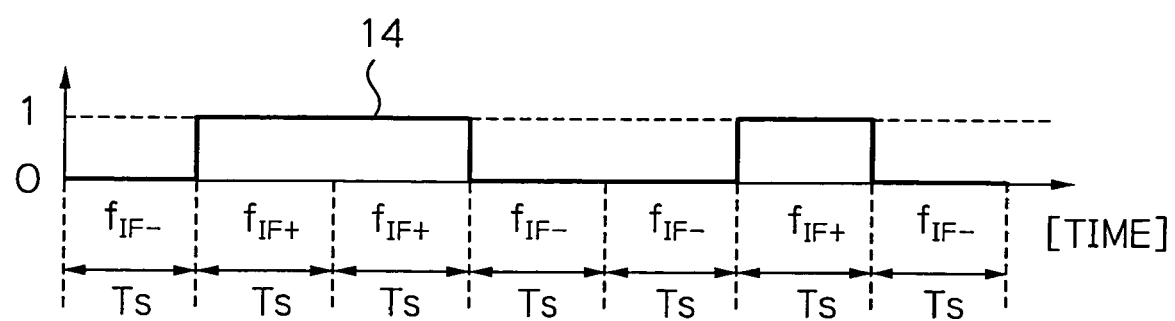
FIG. 9 plots an illustrative output waveform of a sign determination circuit provided in the illustrative embodiment.

When the above-described presupposition and conditions have been met, the relationship of the output waveforms of the digital low-pass filters 36 and 46 is such that, although the frequency components resulting from FSK modulation are opposite in phase relative to each other, the fluctuation components, resulting from the fact that the number of the outputs of the absolute value converters 34, 44, held within the digital low-pass filters, is not equal to an integer multiple of the period of the waveforms of the outputs 74, 76 of the absolute value converter, are in phase with one another, as shown in FIGS. 6 and 7. Thus, by transmitting the outputs of these low-pass filters 36, 46 to the subtractor 54 and summing them together as one of the outputs is inverted in sign, that is, by subtracting the output 80 from the input 78, the frequency components of the FSK modulation strengthen each other and doubled, while unneeded fluctuation components, reversed in sign, cancel each other, thereby eliminating the fluctuation components. The result is that only frequency components of the FSK modulation may be obtained as, for example, an output 56 shown in FIG. 8, and the output 14 of the sign determination circuit 58 is obtained as shown for example in FIG. 9. This eliminates the fluctuation components, which might otherwise deteriorate reception characteristics.

Figure 10:
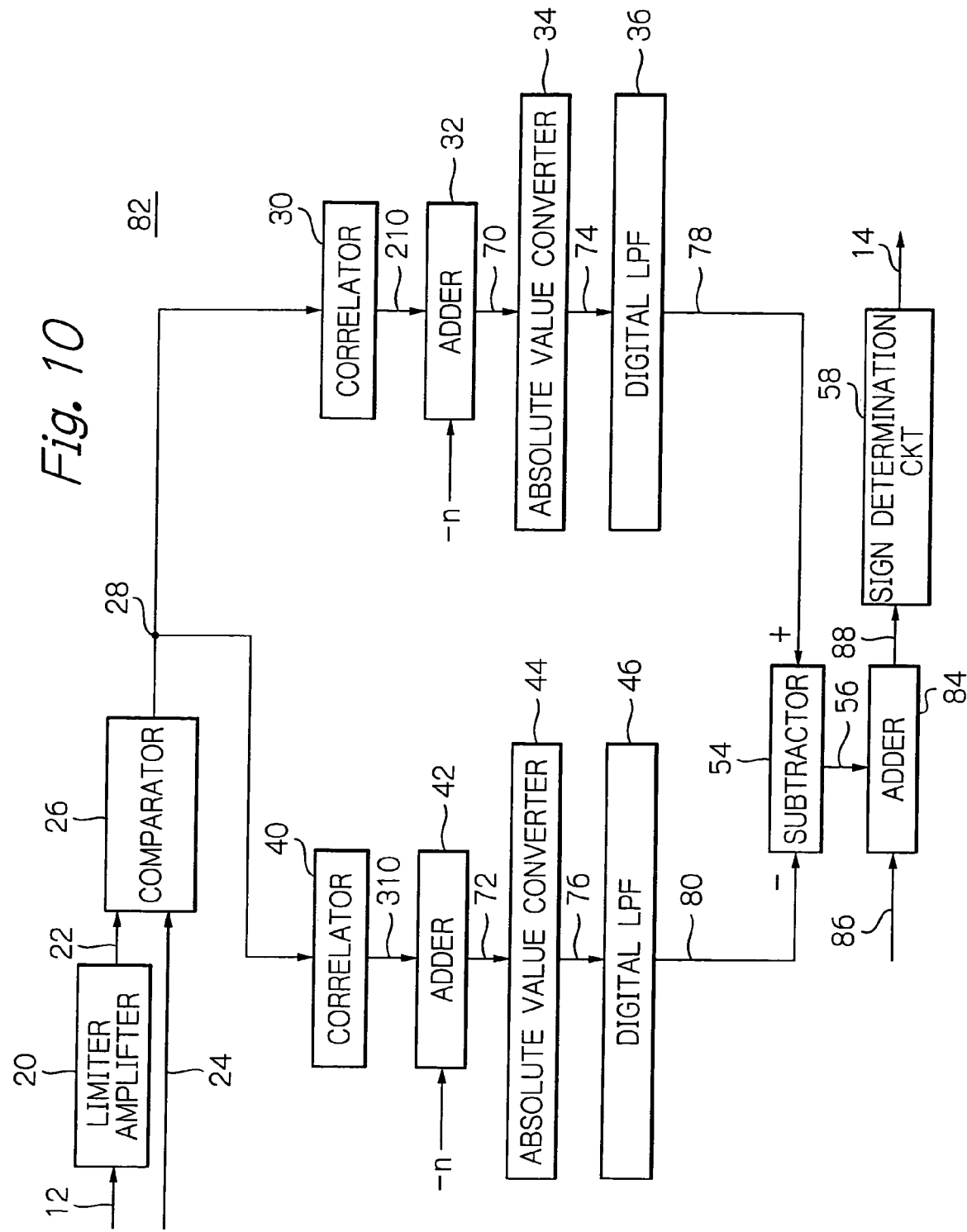
FIG. 10 is a schematic block diagram showing an alternative embodiment of the FSK signal detector.

An alternative embodiment of the FSK signal detector will now be described with reference to FIG. 10. As shown in the figure, an FSK signal detector 82 of the present alternative embodiment includes an adder 84, connected to the output 56 of the subtractor 54, and the sign determination circuit 58 is connected to an output 88 of the adder 85. In other respects, the component parts shown in FIG. 1 may be used unchanged for the present alternative embodiment, and hence the repetitive description thereon is dispensed with.

The adder 84 is adapted for summing a value for correction, supplied from outside, to the output 56 of the subtractor 54, for compensating for the offset of the received frequency in the case where the reference frequency of the receiving device differs from that of the transmitting apparatus. This constitution is effective in further lowering the deterioration of receiving performance in conjunction with the favorable effect derived from the embodiment shown in and described with reference to FIG. 1.

Figure 11:
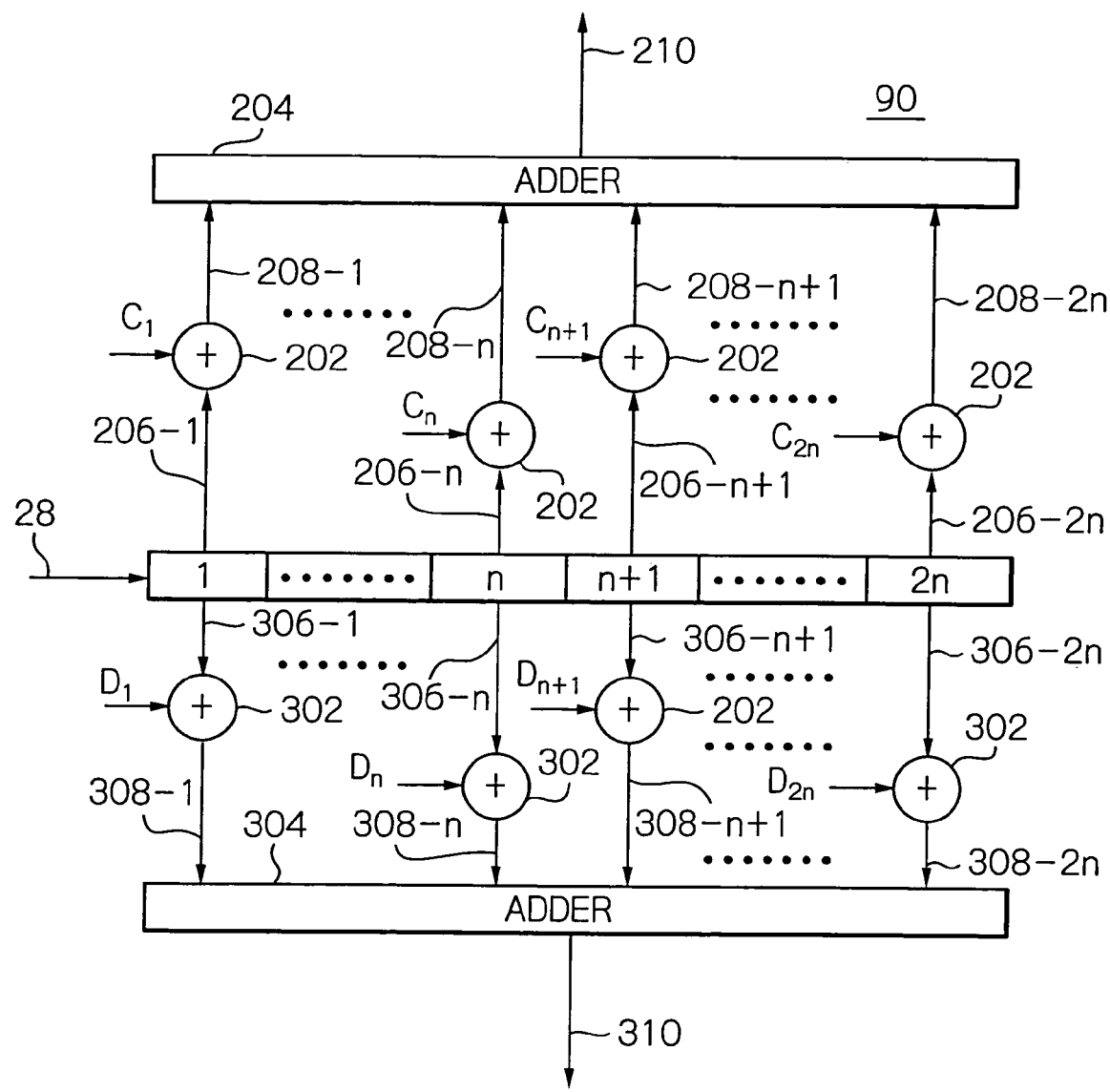
FIG. 11 is a schematic block diagram showing an illustrative constitution of an alternative embodiment of the correlator.

An illustrative constitution in which the correlators 30, 40 in the illustrative embodiments shown in FIGS. 1 and 10 have been unified together into a correlator 90 will now be described with reference to FIG. 11. As shown in the figure, the correlator 90 in the present embodiment includes a sole 2n-stage shift register 92. To this shared shift register 92 are connected adders 204, 304 via operating circuits 202, 302. In the present embodiment, the constitution similar to that shown in FIGS. 2 and 3 is denoted using the same reference numerals.

Figure 12:
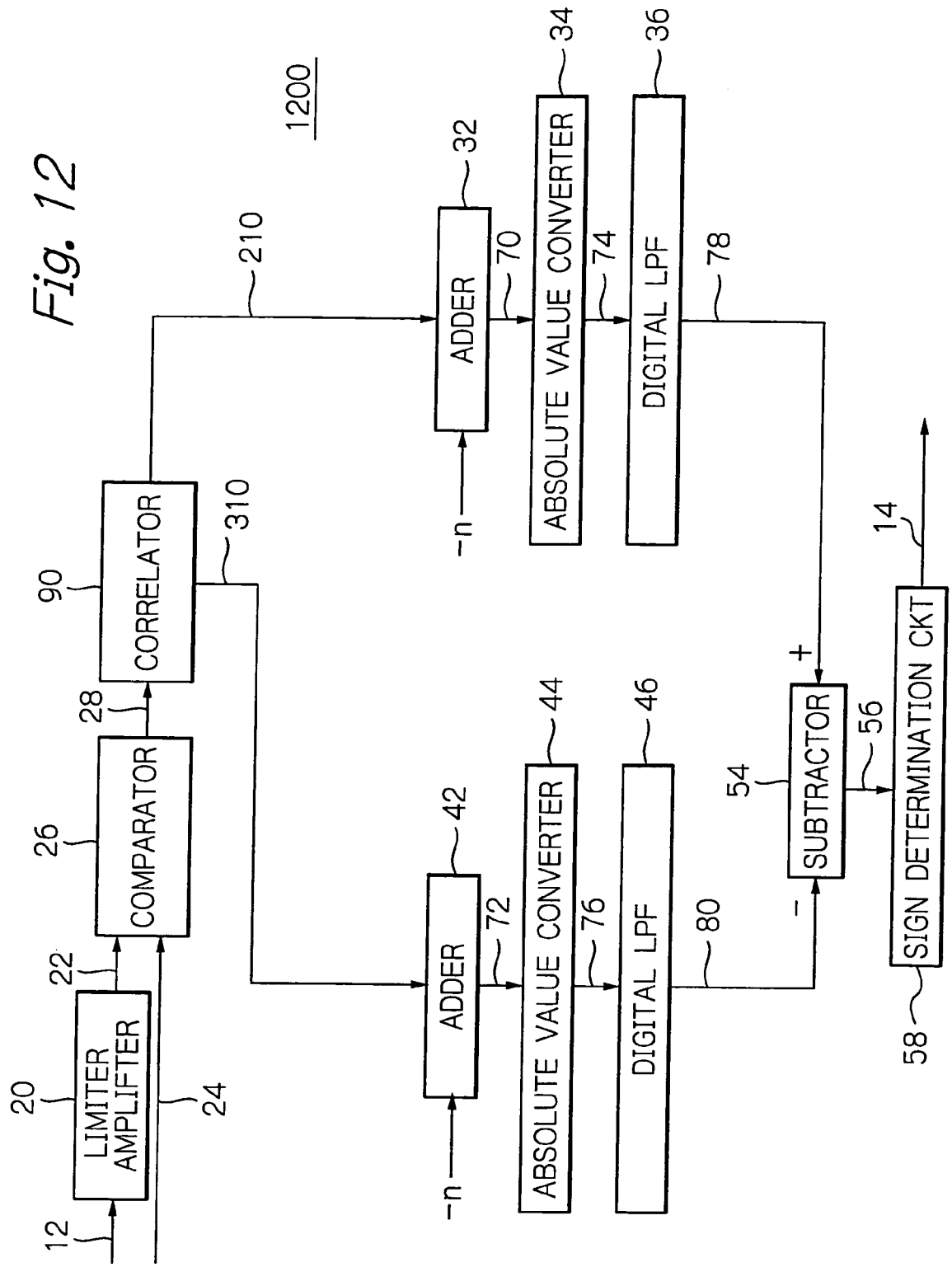
FIG. 12 is a schematic block diagram showing an alternative embodiment of the FSK signal detector to which the correlator shown in FIG. 11 has been applied.

By constituting the correlator 90 as described above, it is possible to reduce the circuit size of the correlator 90 per se. An illustrative constitution, in which the correlator 90 is applied to the FS signal detectors shown in FIGS. 1 and 10, is shown in FIGS. 12 and 13, respectively. With FSK signal detectors 1200, 1300, shown in FIGS. 12 and 13, respectively, a smaller circuit size of the FSK signal detector may be achieved in addition to the favorable advantages proper to the FSK signal detector shown in FIGS. 1 and 10.

The entire disclosure of Japanese patent application No. 2005-280078 filed on Sep. 27, 2005, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An FSK (Frequency Shift Keying) signal detector comprising:
a binarizing circuit for receiving an FSK signal for binarizing an amplitude of the FSK signal;
a first correlator for receiving the FSK signal, binarized by said binarizing circuit, for finding a correlation of the FSK signal with a first correlation signal string which is used to acquire a correlation value by one of two frequency components generated on FSK modulation;
a second correlator for receiving the FSK signal, binarized by said binarizing circuit, for finding a correlation of the FSK signal with a second correlation signal string which is used to acquire a correlation value by another of the two frequency components generated on FSK modulation; and
an operating circuit for performing calculation on an output of said first and second correlators to detect the FSK signal to output the FSK signal detected;
wherein said first correlator includes:
a first shift register, having a plurality of stages, for sequentially shifting the FSK signal;
a first plurality of logical operating circuits connected to respective shift register units of said first shift register for taking exclusive OR of the FSK signal with the first correlation signal string; and
a first addition circuit for adding results of exclusive OR operation generated by said first plurality of logical operating circuits;
said second correlator including:
a second shift register, having a plurality of stages, for sequentially shifting the FSK signal;
a second plurality of logical operating circuits connected to said second shift register for taking exclusive OR of the FSK signal with the second correlation signal string; and
a second addition circuit for adding results of exclusive OR operations generated by said second plurality of logical operating circuits; and
wherein each of said operating circuits includes:
a first adder for adding a value of −n to an output of said first correlator, where n is a natural number;
a first absolute value converter for finding an absolute value of an output of said first adder;
a first low-pass filter for averaging an output of said first absolute value converter;
a second adder for adding the value of −n to an output of said second correlator;
a second absolute value converter for finding an absolute value of an output of said second adder;
a second low-pass filter for averaging an output of said second absolute value converter; and
a subtractor for calculating a difference between outputs of said first and second low-pass filters.

2. The FSK signal detector according to claim 1, further comprising an amplitude limiter for suppressing an amplitude variation component of the FSK signal input in a stage previous to said binarizing circuit.

3. The FSK signal detector according to claim 1 wherein data held in said first and second shift registers are shifted with clocks supplied thereto.

4. The FSK signal detector according to claim 1 wherein said subtractor has an output connected to a circuit for adding a correction value for compensating for an offset of a reception frequency to an output of said subtractor.

5. The FSK signal detector according to claim 1 wherein the first and second correlation signal strings are of a period equivalent to a wavelength of respective ones of two frequency components generated on FSK modulation, based on a width of a variation of the first and second correlation signal strings caused on application of a clock signal to said first and second shift register.

6. The FSK signal detector according to claim 1 wherein said first and second correlation signal strings are of a periods, obtained by an even number of clock signals, equivalent to a wavelength of respective ones of two frequency components generated on FSK modulation, based on a width of a variation of said first and second correlation signal strings caused on application of a clock signal to said first and second shift register.

7. An FSK (Frequency Shift Keying) signal detector comprising:
- a binarizing circuit for receiving an FSK signal for binarizing an amplitude of the FSK signal;
- a first correlator for receiving the FSK signal, binarized by said binarizing circuit, for finding a correlation of the FSK signal with a first correlation signal string which is used to acquire a correlation value by one of two frequency components generated on FSK modulation;
- a second correlator for receiving the FSK signal, binarized by said binarizing circuit, for finding a correlation of the FSK signal with a second correlation signal string which is used to acquire a correlation value by anther of the two frequency components generated on FSK modulation; and
- an operating circuit for performing calculation on an output of said first and second correlators to detect the FSK signal to output the FSK signal detected;
- wherein said first and second correlation signal strings are in phase or opposite in phase by 180 degrees with respect to a phase of respective ones of two frequency components generated on FSK modulation, based on a width of a variation of the first and second correlation signal strings when a phase at a virtual mid position of an n-th register unit and an (n+1)th register unit of said first and second shift registers are varied on application of a clock signal to said first and second shift register, where n is a natural number.

8. The FSK signal detector according to claim 1 wherein the first and second correlation signal strings are of a bi-level expression, with numbers of 1 and 0 or numbers equivalent to 1 and 0 being equal to n, where n is a natural number.

9. The FSK signal detector according to claim 1 wherein said first and second correlators are united into a sole third shift register,
- said first plurality of logical operating circuits and said second plurality of logical operating circuits being interconnected to said third shift register.

* * * * *